(12) United States Patent
Elumalai et al.

(10) Patent No.: US 8,102,841 B2
(45) Date of Patent: Jan. 24, 2012

(54) AUXILIARY PERIPHERAL FOR ALERTING A COMPUTER OF AN INCOMING CALL

(75) Inventors: Arulkumar Elumalai, Seattle, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1246 days.

(21) Appl. No.: 11/566,789

(22) Filed: Dec. 5, 2006

(65) Prior Publication Data

US 2008/0130848 A1 Jun. 5, 2008

(51) Int. Cl.
H04L 12/66 (2006.01)
H04M 11/00 (2006.01)
H04M 15/06 (2006.01)
H04M 3/42 (2006.01)

(52) U.S. Cl. ............... 370/353; 379/93.35; 379/142.08; 379/215.01

(58) Field of Classification Search .................. 370/325, 370/353; 379/93.35, 142.08, 215.01
See application file for complete search history.

(56) References Cited

U.S. PATENT DOCUMENTS

| | | | |
|---|---|---|---|
| 6,516,059 B1 | 2/2003 | Shaffer et al. | |
| 6,647,103 B2 | 11/2003 | Pinard et al. | |
| 7,076,275 B1 | 7/2006 | Karstens et al. | |
| 7,099,452 B1 * | 8/2006 | Infosino | 379/215.01 |
| 2003/0064711 A1 | 4/2003 | Gilbert et al. | |
| 2003/0179743 A1 | 9/2003 | Bosik et al. | |
| 2004/0062204 A1 | 4/2004 | Bearden et al. | |
| 2004/0114730 A1 * | 6/2004 | Koch et al. | 379/9 |
| 2005/0202807 A1 * | 9/2005 | Ayyasamy et al. | 455/418 |
| 2005/0226398 A1 | 10/2005 | Bojeun | |
| 2006/0023695 A1 * | 2/2006 | Yarlagadda et al. | 370/352 |
| 2007/0067445 A1 * | 3/2007 | Vugenfirer et al. | 709/224 |

FOREIGN PATENT DOCUMENTS

| | | |
|---|---|---|
| GB | 2318703 A | 4/1998 |
| KR | 20020048457 | 6/2002 |
| WO | WO0048382 | 8/2000 |
| WO | WO2005099242 | 10/2005 |

(Continued)

OTHER PUBLICATIONS

"Internet Telephony: 'My computer is ringing your phone'; MediaRing Joins Delta Three for PC-to-Phone Internet Calling—Company Business and Marketing," EDGE, On & About AT&T, Mar. 29, 1999, http://findarticles.com/p/articles/mi_m0UNZ/is_1999_March_29/ai_54242655, [last accessed Sep. 13, 2006].

(Continued)

*Primary Examiner* — Ronald Abelson
(74) *Attorney, Agent, or Firm* — Perkins Coie LLP

(57) ABSTRACT

An auxiliary call control component is coupled to a computing system alerts the computing system of an incoming call in instances where the computing system is not capable of processing the incoming call. When the auxiliary call control component receives an incoming call, the auxiliary call control component determines whether the coupled computing system is in a proper state suitable for processing (e.g., "picking up") the incoming call. If the computing system is not in the proper state, the auxiliary call control component accepts the incoming call, signals the computing system to enter the proper state, and informs the computing system of the incoming call. When placed in the proper state, the computing system may retrieve the incoming call to allow the user to receive to the incoming call at the computing system.

18 Claims, 5 Drawing Sheets

FOREIGN PATENT DOCUMENTS

WO  WO2006030997  3/2006

OTHER PUBLICATIONS

"Windows Power Management," Dec. 4, 2001, http://www.microsoft.com/whdc/archive/winpowmgmt.mspx, [last accessed Sep. 13, 2006].

Bishop, Todd, "Microsoft links PC to phone, to create communication hub," Oct. 20, 2004, http://seattlepi.nwsource.com/business/195923_msftphone20 html, [last accessed Sep. 13, 2006].

International Search Report for PCT/US2007/079587, Mailing Date of Feb. 13, 2008, 2 pages.

PCT International Preliminary Report on Patentability for PCT/US2007/079587, Issuance of report: Jun. 10, 2009, 4 pages.

* cited by examiner

US 8,102,841 B2

AUXILIARY PERIPHERAL FOR ALERTING A COMPUTER OF AN INCOMING CALL

BACKGROUND

Computer-implemented communication techniques that use messaging services are becoming increasingly common, and are employed in many contexts including voice communication (e.g., Voice over IP (VoIP), instant messaging, realtime communication between applications, etc.). In general, messaging services require a networking protocol to establish and manage communications between participants. These services may use various mechanisms to establish sessions, including session protocols such as a "Session Initiation Protocol" ("SIP"). SIP is an application-layer control protocol that computer systems can use to discover one another and to establish, modify, and terminate sessions. SIP is an Internet proposed standard. Its specification, "RFC 3261," is available at <http://www.ietf.org/rfc/rfc3261.txt>. A specification for extensions to SIP relating to event notifications, "RFC 3265," is available at <http://www.ietf.org/rfc/rfc3265.txt>.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is an entity that acts as a server to clients and a client to servers. In so doing, proxy servers intercept, interpret, or forward messages between UACs and UASs. A redirect server accepts a SIP request and generates a response directing the UAC that sent the request to contact an alternate network resource. A registrar is a server that accepts registration information from user agents and informs a location service of the received registration information.

SIP supports multiple message types, including requests, which are sent from a UAC to a UAS, and responses, which are sent from a UAS to a UAC when responding to a request. A SIP message can be composed of three parts. The first part of a SIP message is a "request line," which includes fields to indicate a message (e.g., INVITE) and a request URI that identifies the user or service to which the request is being directed. The second part of a SIP message comprises headers whose values are represented as name-value pairs. The third part of a SIP message is the message's body, which is used to describe the session to be initiated or which contains data that relates to the session. Message bodies may appear in requests, responses, or other SIP messages.

A VoIP telephone call can be initiated by a caller's device sending a SIP INVITE request identifying the address (e.g., telephone number) of the callee to be called. When the callee's device receives the invitation, it can notify the callee of the invitation and send a SIP SESSION-In-PROGRESS message to the caller. When the callee answers, the callee's device responds to the INVITE request with a SIP 200 OK message. The conversation between the caller and callee can then be transmitted in packets using the Real-Time Protocol. When the caller hangs up, the caller's device sends a SIP BYE request to the callee to terminate the call.

VoIP allows general purpose computers, such as traditional personal computers (PCs), to function as PC-based phone systems. For example, VoIP software may be loaded and executed on the PCs, turning the PCs into PC-based telephones (e.g., VoIP "softphones"). Users can then use the PC-based telephones to place calls over the Internet to other PC-based telephones or to fixed or cell phones. Unfortunately, the PC-based telephone relies solely on the activity on the PC to respond to incoming calls. Thus, in instances where the PC is hibernating or powered off, the telephone experience cannot be accomplished at the PC.

SUMMARY

A method and system for alerting a computing system that is presently not capable of processing an incoming call, such as a VoIP call, of the incoming call is provided. For example, the computing system may presently be hibernating, powered off, or not an active communication endpoint (e.g., a user is not presently logged onto the computing system), and thus not capable of processing an incoming call. An auxiliary call control component coupled to a computing system, upon receiving an incoming call addressed to a user, signals the coupled computing system to enter a state that allows the user to receive the incoming call using the computing system. For example, when an incoming call arrives, the auxiliary call control component determines whether the coupled computing system is in a proper state suitable for processing (e.g., "picking up") the incoming call. If the computing system is not in the proper state, the auxiliary call control component accepts the incoming call, signals the computing system to enter the proper state, and informs the computing system of the incoming call. When placed in the proper state, the computing system may retrieve the incoming call to allow the user to receive to the incoming call at the computing system. The user can then respond to the call using the computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
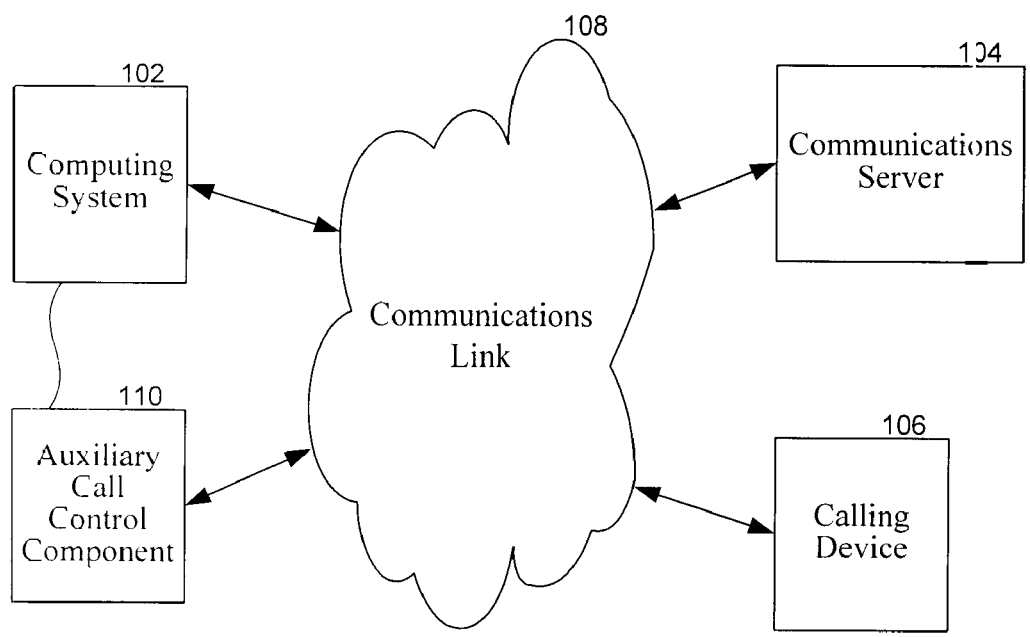
FIG. 1 is a high-level block diagram showing an example environment in which an auxiliary call control component may operate.

A method and system for alerting a computing system that is presently not capable of processing an incoming call, such as a VoIP call, of the incoming call is provided. For example, the computing system may presently be hibernating, powered off, or not an active communication endpoint (e.g., a user is not presently logged onto the computing system), and thus not capable of processing an incoming call. In some embodiments, an auxiliary call control component coupled to a computing system, upon receiving an incoming call addressed to a user, signals the coupled computing system to enter a state that allows the user to receive the incoming call using the computing system. For example, when an incoming call arrives, the auxiliary call control component determines whether the coupled computing system is in a proper state suitable for processing (e.g., "picking up") the incoming call. If the computing system is not in the proper state, the auxiliary call control component accepts the incoming call, signals the computing system to enter the proper state, and informs the computing system of the incoming call. When placed in the proper state, the computing system may retrieve the incoming call to allow the user to receive to the incoming call at the computing system. The user can then respond to the call using the computing system. For example, in the instance where the computing system is currently hibernating, the auxiliary call control component may signal the computing system to "wake up" from the hibernation state and provide a notification of the incoming call. In the instance where the computing system is currently powered off, the auxiliary call control component may signal the computing system to start the "power cycle" sequence, causing the computing system to power on. Once powered on, the computing system can alert the user to register the computing system as an endpoint and receive the incoming call. In the instance where the computing system is not an endpoint, the auxiliary call control component may signal the computing system to alert the user to register the computing system as an endpoint and receive the incoming call.

In some embodiments, if the computing system is not in the proper state when an incoming call is received by the auxiliary call control component, the auxiliary call control component may signal to the caller indicating that the user is preparing the computing system to process the call and requesting that the caller wait for the call to be completed. For example, the auxiliary call control component can send a signal informing that the computer system is waking up and prompting the caller to wait via the communications server.

By way of an example scenario, a user first uses a client application (e.g., MICROSOFT Office Communicator) executing on a computing system to log onto a communications server (e.g., MICROSOFT Live Communications Server). When the user logs on the communications server, the instance of the client application becomes an endpoint of the user. The client application may then provide the user an option to activate a coupled auxiliary call control component. The user may then use the client application to register the auxiliary call control component with the communications server as another endpoint of the user. For example, the user can register the auxiliary call control component with the communications server using the user credentials (e.g., user identification and password) which were used when logging onto the communications server using the client application. The computing system may then enter a state where the computing system is not capable of picking up, and providing the user a notification of, an incoming call. For example, the computing system may enter a hibernation state. Alternatively, the user may use the client application to log off of the communications server or power off the computing system, thus causing the client application to no longer function as an endpoint of the user. Subsequently, an incoming call addressed to the user may be received at the communications server. For example, another user (caller) may register an appropriate computing device with the communications server and initiate a call to the user. When the incoming call addressed to the user is received at the communications server, the communications server can fork the call to all of the user's registered endpoints, including the auxiliary call control component. When the auxiliary call control component receives the incoming call, the auxiliary call control component checks to determine whether the computing system is in the proper state. If the computing system is in the proper state, the auxiliary call control component does not process the incoming call. If the computing system is not in the proper state, the auxiliary call control component picks up the incoming call and places it on hold. For example, the auxiliary call control component can signal the communications server to "park" the incoming call (i.e., place the incoming call on hold). In response, the communications server may signal the caller that the call has been placed on hold. The communications server may also play/display a recording (e.g., message, advertisement, music, etc.) at the caller endpoint while the call is on hold. The auxiliary call control component may then signal the computing system to cause the computing system to enter the proper state. Once the computing system enters the proper state, the user may sign onto the client application, retrieve the incoming call, and start the conversation. For example, when the user signs onto the client application, the client application can query the communications server for the parked incoming calls for the user, and the user can retrieve the appropriate incoming call. Alternatively, the auxiliary call control component may provide the client application an identifier of the parked incoming call, and the client application can retrieve the identified incoming call from the communications server.

The auxiliary call control component may be a peripheral attached to the computing system. When activated, the auxiliary call control component may function as a user endpoint capable of communicating with the communications server to receive and answer calls addressed to the user. The auxiliary call control component may communicate with the communications server using SIP or any of a variety of well-known signaling protocols. The auxiliary call control component includes its own network connection, which allows the auxiliary call control component to communicate with the communications server. In some embodiments, the auxiliary call control component includes its own power source independent of the computing system to which it is attached. This allows the auxiliary call control component to be activated (e.g., powered on and coupled to the network to receive incoming calls) even when the attached computing system is powered off. In these embodiments, the auxiliary call control component can still function as an endpoint of the user because of the auxiliary call control component's independent power source and network connection. In the embodiments where the auxiliary call control component does not have an independent power source, the auxiliary call control component may receive its power from the attached computing system. In these embodiments, the auxiliary call control component is capable of functioning as an endpoint of the user only when the attached computing system is in a state where it can serve as a source of power to the auxiliary call control component (e.g., when the attached computing system is powered on). For example, a battery-powered laptop computer can power the auxiliary call control component even when the laptop computer is powered off.

In some embodiments, the auxiliary call control component allows the user to "deflect" or forward an incoming call to another address (e.g., telephone number). The auxiliary call control component may allow the user to set a deflect number (also referred to herein as a "forwarding number") (e.g., mobile phone number, email address, or other suitable address to which the incoming call can be deflected or forwarded to). For example, the auxiliary call control component may provide an input panel with which the user can set a forwarding number. As another example, the user may set a forwarding number on the auxiliary call control component using the coupled computing system. When the auxiliary call control component receives an incoming call, the auxiliary call control component checks to determine whether the computing system is in the proper state. If the computing system is in the proper state, the auxiliary call control component does not process the incoming call. If the computing system is not in the proper state, the auxiliary call control component checks to determine if a forwarding number has been set. If a forwarding number has been set, the auxiliary call control component forwards the incoming call to the preconfigured forwarding number. If a forwarding number has not been set, the auxiliary call control component picks up the incoming call, places it on hold, and signals the computing system to cause the computing system to enter the proper state for retrieving the incoming call.

In some embodiments, the auxiliary call control component allows the user to set one or more forwarding rules. For example, one forwarding rule may specify that incoming calls from a specific caller is to be forwarded to one telephone number, while incoming calls from all other callers are to be forwarded to another telephone number or sent directly to voice mail. The user may set the forwarding rules using an input panel provided by the auxiliary call control component, or download the forwarding rules onto the auxiliary call control component using the computing system. Then, upon receiving an incoming call, the auxiliary call control component can check to determine whether the computing system is in the proper state. If the computing system is in the proper state, the auxiliary call control component does not process the incoming call. If the computing system is not in the proper state, the auxiliary call control component checks to determine whether forwarding rules have been set. If forwarding rules have been set, the auxiliary call control component can apply the forwarding rule or rules and forward the incoming call accordingly. If forwarding rules have not been set, the auxiliary call control component picks up the incoming call, places it on hold, and signals the computing system to cause the computing system to enter the proper state for retrieving the incoming call.

In some embodiments, the auxiliary call control component provides a deflect button for forwarding incoming calls. For example, the auxiliary call control component may allow the user to set a forwarding number or one or more forwarding rules. When the auxiliary call control component receives an incoming call, the auxiliary call component can provide an indication of the incoming call. The user can then activate (e.g., depress) the deflect button to forward the incoming call. The indication of the incoming call may be visual (e.g., a light, a message displayed on a provided display screen, etc.) or audible (e.g., sound generated on a provided speaker). In some embodiments, the auxiliary call control component may provide the indication of the incoming call upon determining that the computing system is not in the proper state for picking up the incoming call.

In some embodiments, the auxiliary call control component provides a display screen for providing visual indications of incoming calls. For example, when the auxiliary call control component receives an incoming call, the auxiliary call control component may display on the display screen a message informing the user of the incoming call. The auxiliary call control component may also display on the display screen the identity of the caller.

FIG. 1 is a high-level block diagram showing an example environment in which an auxiliary call control component may operate. The illustrated environment is only one example of a suitable operating environment and is not intended to suggest any limitation as to the scope of use or functionality of the auxiliary call control component. As depicted, the environment comprises a computing system 102, a communications server 104, and a calling device 106, each coupled to a communications link 108. In general terms, the communications server provides address resolution services to facilitate telephony and communications services, such as VoIP, softphone, and the like, between registered users. The calling device may be any device that is suitable for sending and receiving voice communications and messages, such as VoIP messages, via one or more wired and/or wireless communication interfaces. The computing system may be any computing device that provides its user access to the telephony and communications services provided by the communications server. Similar to the calling device, the computing system may be any computing device that is suitable for allowing its user to send and receive voice communications and messages, such as VoIP messages, via one or more wired and/or wireless communication interfaces. For example, a client application suitable for communicating with and providing access to the services provided by the communications server may execute on the computing system to provide its user the capability to send and receive voice communications and messages. The communications link facilitates the transfer of electronic content between, for example, the calling device, the communications server, and the computing system. In some embodiments, the communications link includes the Internet. It will be appreciated that the communications link may be comprised of one or more other types of networks, such as a local area network, a wide area network, a point-to-point dial-up connection, and the like. The voice communications and messages between the calling device, communications server, and computing system may be conducted using any of a variety of well-known communications protocols, including Real-time Transport Protocol (RTP), SIP over the User Datagram Protocol (UDP), and the like.

As depicted in FIG. 1, the computing system is coupled to an auxiliary call control component 110, which is also coupled to the communications link. The auxiliary call control component may be implemented as a component external to the computing system (as shown in FIG. 1) or as a component that is internal to the computing system. For example, the auxiliary call control component may be implemented within the housing of a laptop, portable, or other non-stationary computer system. In general terms, the auxiliary call control component alerts the coupled computing system of incoming calls in instances where the coupled computing system is currently unable to provide notifications of the incoming calls. The coupling between the computing system and the auxiliary call control component may be any coupling or connection that enables communication, including the sending and receiving of signals, between the computing system and the auxiliary call control component. In various embodiments, the coupling may need to enable: the auxiliary call control component to determine the state of the computing system; the auxiliary call control component to signal an operating system executing on the computing system to wake from a state of hibernation; the auxiliary call control component to signal the operating system on the computing system to start execution of an application (e.g., for registering with the communications server) on the computing system; the auxiliary call control component to send information, such as an identifier of an incoming call, to the computing system; the auxiliary call control component to signal the hardware on the computing system to power up; the computing system to control the auxiliary call control component in registering with the communications server; the computing system to download forwarding numbers and/or forwarding rules; and other communication/signaling between the computing system and the auxiliary call control component to facilitate the functions and features of the auxiliary call control component described herein. In some embodiments, the coupling may be via a wired communication interface, such as through a Universal Serial Bus (USB) connection, a serial bus connection, or any of a variety of other well-known wired communications interfaces. In other embodiments, the coupling may be via a wireless communication interface, such as through a wireless USB connection, Bluetooth, or any of a variety of other well-known wireless communications interfaces.

Figure 2:
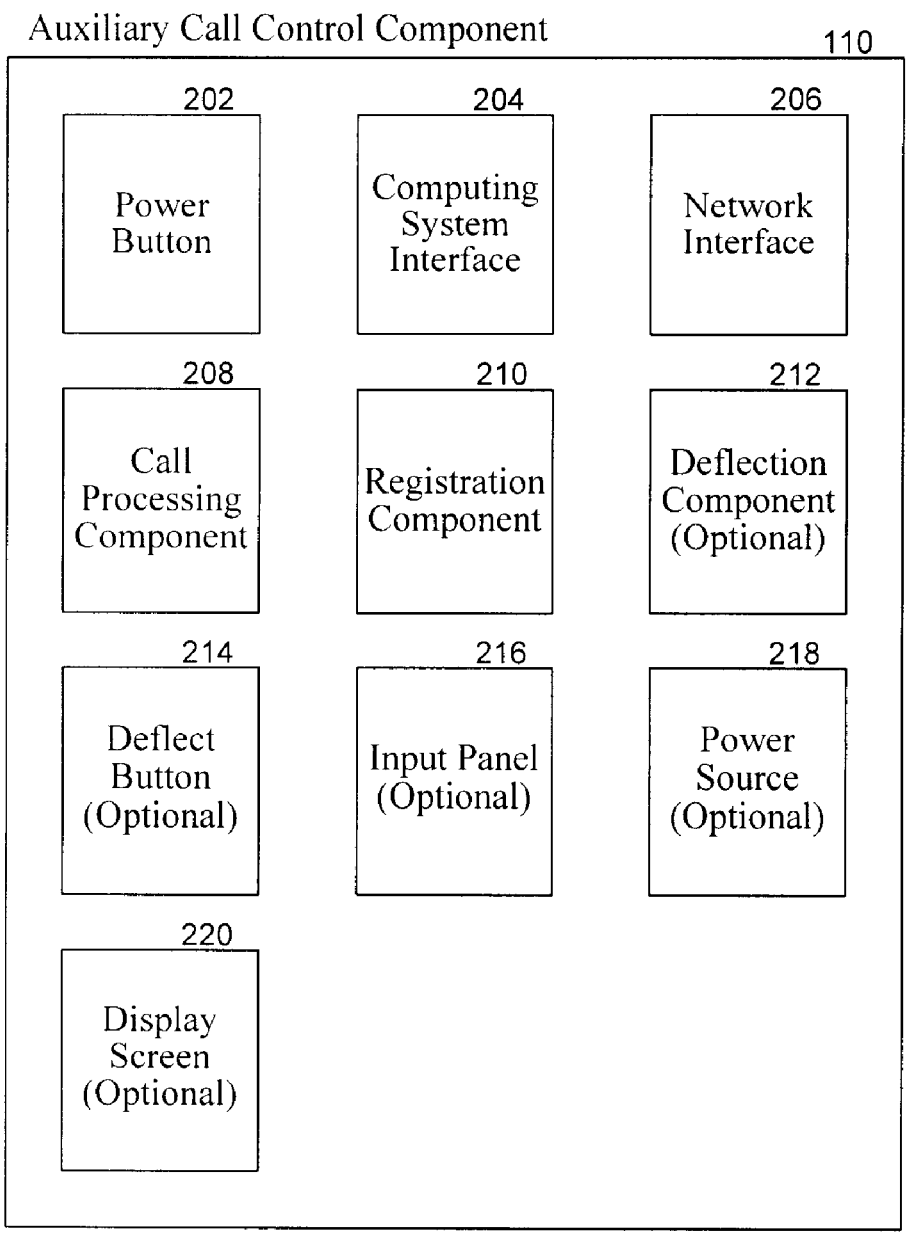
FIG. 2 is a high-level block diagram that illustrates selected components of the auxiliary call control component, according to some embodiments.

FIG. 2 is a high-level block diagram that illustrates selected components of the auxiliary call control component, according to some embodiments. As depicted, the auxiliary call control component comprises a power button 202, a computing system interface 204, a network interface 206, a call processing component 208, a registration component 210, an optional deflection component 212, an optional deflect button 214, an optional input panel 216, an optional power source 218, and an optional display screen 220. The power button allows the auxiliary call control component to be powered "on" or "off." The computing system interface facilitates the connection of the auxiliary call control component to the computing system, and allows for the sending of signals to, and receiving of signals from, the computing system. The network interface facilitates the connection of the auxiliary call control component to the communications link, and allows for the sending and receiving of signals over the communications link. The call processing component is invoked to process incoming calls received via, for example, the network interface. In processing the incoming calls, the call processing component communicates with the computing system via the computing system interface. The registration component is invoked to register the auxiliary call control component as an endpoint with the communications server. The deflection component is invoked to forward incoming calls to another address or addresses (e.g., telephone number (s)). For example, the call processing component may invoke the deflection component to forward an incoming call to a forwarding number. The deflect button is a control that allows a user to control the deflection of an incoming call to a forwarding number. The input panel facilitates the inputting of commands and/or information to the auxiliary call control component. For example, a user can use the input panel to enter a forwarding number or numbers, a forwarding rule or rules, and other commands/information into the auxiliary call control component. The power source supplies the electrical or other types of energy to allow the auxiliary call control component to function. For example, the power source may be provided via one or more rechargeable batteries. Alternatively, the power source may be provided via an electrical connection, an Ethernet connection (e.g., provided via the network interface), a power supply, or other suitable connection to an electrical source. In the embodiments where the auxiliary call control component does not include the power source, the auxiliary call control component may be powered by a coupled computing system (i.e., the coupled computing system may serve as the source of power to the auxiliary call control component). In these embodiments, the auxiliary call control component may function only when the computing system is able to provide power to the auxiliary call control component. In the embodiments where the power source is provided independent of a coupled computing system, the auxiliary call control component is able to function even when the computing system is powered off. The display screen facilitates the display of information. For example, the call processing component may provide an indication of an incoming call (e.g., Caller ID) on the display screen.

The computing device on which the auxiliary call control component may be implemented may include a central processing unit, memory, input devices (e.g., keyboard and pointing devices), output devices (e.g., display devices), and storage devices (e.g., disk drives). The memory and storage devices are computer-readable media that may contain computer executable instructions that implement the auxiliary call control component. As used herein, "computer-readable media encoded with computer executable instructions" means computer-readable media comprising computer executable instructions. In addition, the data structures and message structures may be stored or transmitted via a data transmission medium, such as a signal on the communications link. Various communication links may be used, such as the Internet, a local area network, a wide area network, a point-to-point dial-up connection, a cell phone network, and so on.

The auxiliary call control component may be implemented in and used by various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The auxiliary call control component may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
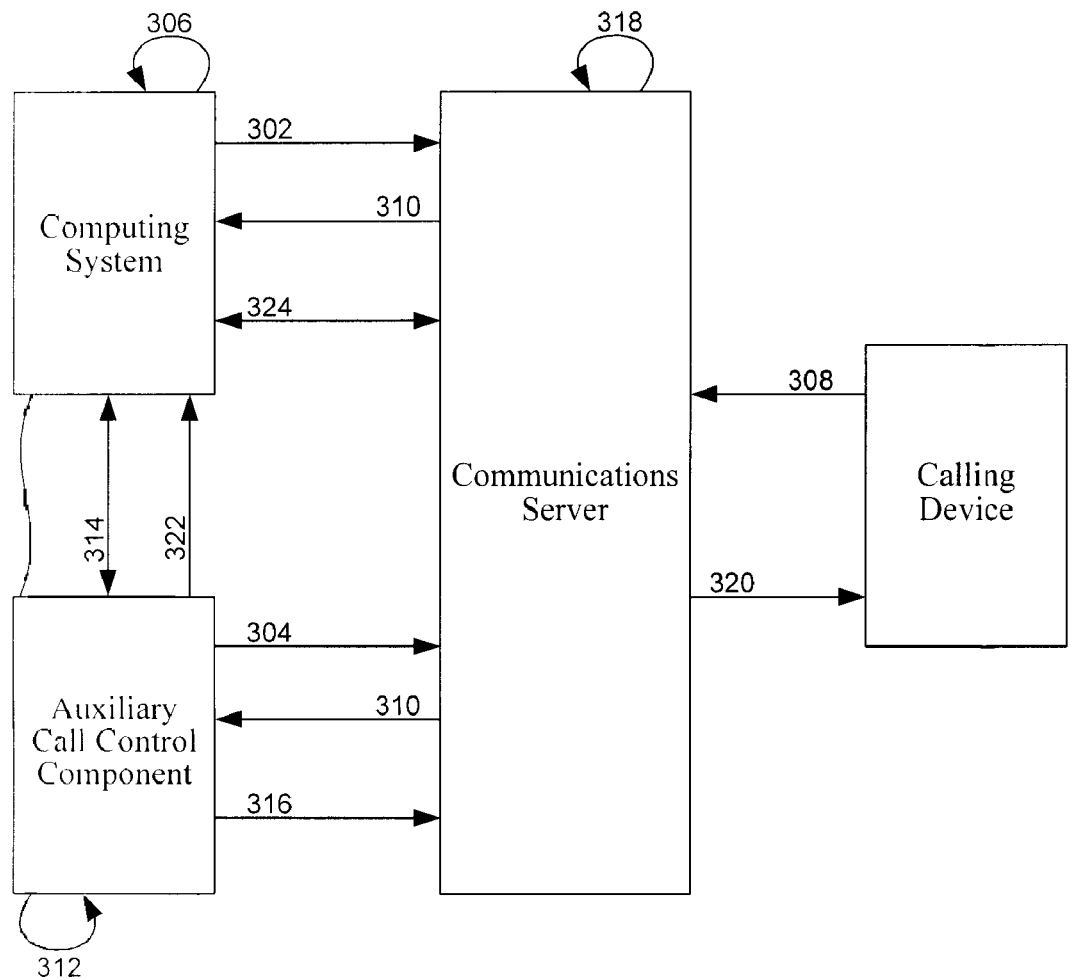
FIG. 3 is a data flow diagram that illustrates the flow of data to process an incoming call at the auxiliary call control component, according to some embodiments.

FIG. 3 is a data flow diagram that illustrates the flow of data to process an incoming call at the auxiliary call control component, according to some embodiments. A user uses a computing system to register 302 with a communications server. This causes the user's computing system to become an endpoint for the user. The user then activates a coupled auxiliary call control component and registers 304 the auxiliary call control component with the communications server. This causes the auxiliary call control component to also be an endpoint for the user. Subsequently, the user's computing system hibernates 306 (i.e., enters a state where the computing system cannot pick up an incoming call). A caller then uses a calling device and initiates 308 a call to the user. The communications server processes the call by forking 310 the call to each of the user's endpoints. The user's computing system is hibernating and, thus, not able to process the incoming call to the user, but the auxiliary call control component is able to process the incoming call to the user. The auxiliary call control component optionally (as indicated by the dashed line) provides an indication 312 of the incoming call to the user on its display screen. The auxiliary call control component determines 314 the state of the computing system. Because the computing system is in a state where it cannot process the incoming call, the auxiliary call control component picks up 314 the incoming call to the user and requests that the communications server place the call to the user on hold. In response, the communications server places 318 the call to the user on hold, and informs 320 the calling device that the call to the user is being put on hold. The auxiliary call control component also signals 322 the computing system to enter a proper state where the computing system can pick up the call to the user. When the computing system enters the proper state, the computing system retrieves 324 the parked call to the user (i.e., the incoming call to the user that was placed on hold) from the communications server, thus allowing the user to receive the call using the computing system.

One skilled in the art will appreciate that, for this and other processes and methods disclosed herein, the functions/steps performed in the processes and methods may be altered in various ways. For example, the order of the outlined steps is only exemplary, and the steps may be rearranged, some of the steps may be optional, substeps may be performed in parallel, some of the steps may be combined into fewer steps or expanded into additional steps, other steps may be included, etc.

Figure 4:
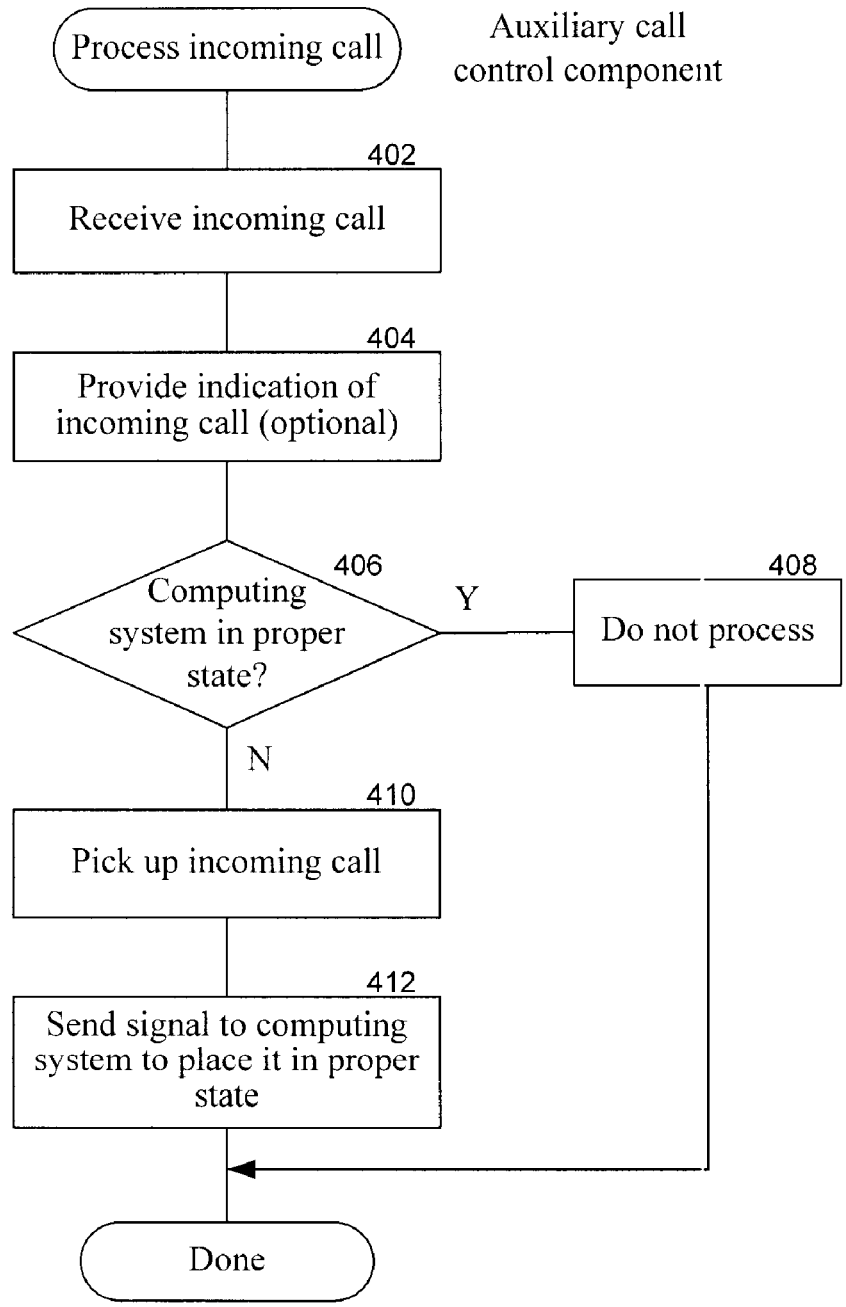
FIG. 4 is a flow diagram that illustrates the processing of the auxiliary call control component to process an incoming call, according to some embodiments.

FIG. 4 is a flow diagram that illustrates the processing of the auxiliary call control component to process an incoming call, according to some embodiments. The auxiliary call control component is coupled to a user's computing system and registered as an endpoint for the user with a remote communications server In block 402, the auxiliary call control component receives an incoming from the communications server. In block 404, the auxiliary call control component optionally provides an indication of the incoming call. In decision block 406, if the coupled computing system is in the proper state for picking up the incoming call, then the auxiliary call control component continues at block 408, else the auxiliary call control component continues at block 410. In block 408, because the coupled computing system is in the proper state to pick up the incoming call, the auxiliary call control component does not pick up the incoming call, and completes. In block 410, because the coupled computing system is not in the proper state to pick up the incoming call, the auxiliary call control component picks up the incoming call. The auxiliary call control component may also send a request to the communications server to place the incoming call on hold. In block 412, the auxiliary call control component sends a signal to the computing system to place the computing system in the proper state for picking up the incoming call. The auxiliary call control component then completes.

Figure 5:
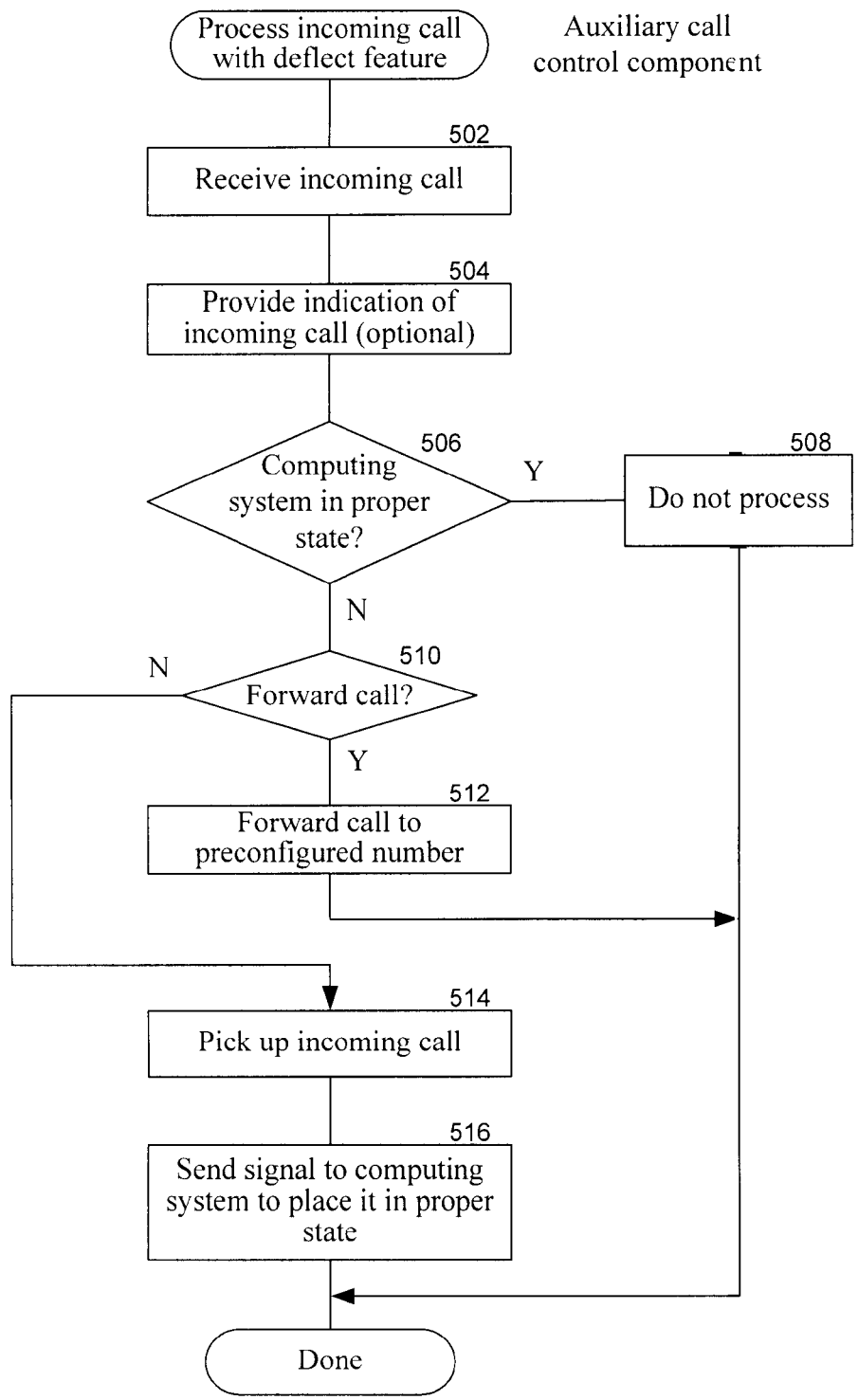
FIG. 5 is a flow diagram that illustrates the processing of the auxiliary call control component to process an incoming call with a deflect feature, according to some embodiments.

FIG. 5 is a flow diagram that illustrates the processing of the auxiliary call control component to process an incoming call with a deflect feature, according to some embodiments. The auxiliary call control component is coupled to a user's computing system and registered as an endpoint for the user with a remote communications server. In block 502, the auxiliary call control component receives an incoming from the communications server. In block 504, the auxiliary call control component optionally provides an indication of the incoming call. In decision block 506, if the coupled computing system is in the proper state for processing the incoming call, then the auxiliary call control component continues at block 508, else the auxiliary call control component continues at decision block 510. In block 508, because the coupled computing system is in the proper state to process the incoming call, the auxiliary call control component does not process the incoming call, and completes. In decision block 510, if the incoming call is to be forwarded, then the auxiliary call control component continues at block 512, else the auxiliary call control component continues at block 514. By way of example, the user may have configured the auxiliary call control component to forward incoming calls to a preconfigured number whenever the computing system is hibernating. In block 512, because the incoming call is to be forwarded, the auxiliary call control component forwards the incoming call to the preconfigured number. The auxiliary call control component then completes. In block 514, because the incoming call is not to be forwarded, the auxiliary call control component picks up the incoming call. The auxiliary call control component may also send a request to the communications server to place the incoming call on hold. In block 516, the auxiliary call control component sends a signal to the computing system to place the computing system in the proper state for processing the incoming call. The auxiliary call control component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in an auxiliary call control component for alerting a coupled computing system of an incoming call addressed to a user, the method comprising:
    receiving at the auxiliary call control component the incoming call addressed to the user, the incoming call having a caller;
    determining whether the computing system is in a proper state for picking up the incoming call; and
    after determining that the computing system is not in the proper state,
        picking up the incoming call prior to the computing system entering the proper state;
        after picking up the incoming call, sending a notification that the incoming call is on hold so that the caller can be notified that the incoming call is on hold; and
        signaling the computing system to cause the computing system to enter the proper state; and
    after determining that the computing system is in the proper state, suppressing the picking up of the incoming call so that the computing system can pick up the incoming call.

2. The method of claim 1, wherein the auxiliary call control component is registered with a communications server as an endpoint of the user, and further wherein the incoming call is received from the communications server.

3. The method of claim 1, wherein signaling the computing system causes the computing system to power on.

4. The method of claim 1, wherein signaling the computing system causes the computing system to wake from a hibernation state.

5. The method of claim 1, wherein signaling the computing system causes the computing system to enter a state suitable for picking up the incoming call.

6. The method of claim 1 further comprising:
    upon determining that the computing system is not in the proper state, determining whether to forward the incoming call; and
    upon determining to forward the incoming call, forwarding the incoming call to a preconfigured number.

7. The method of claim 6, wherein the preconfigured number is determined based on at least one forwarding rule.

8. The method of claim 6, wherein the auxiliary call control component determines to forward the incoming call based on an activation of a deflect button.

9. The method of claim 6, wherein the auxiliary call control component determines to forward the incoming call based on at least one forwarding rule.

10. A computer-readable storage media encoded with computer executable instructions for controlling an auxiliary call control component to alert a computing system of an incoming call, by a method comprising:
   registering with a communications server as an endpoint for a user;
   receiving from a caller an incoming call for the user; and
   upon receiving the incoming call,
      determining whether the computing system is in a proper state for alerting the user of the incoming call;
      upon determining that the computing system is not in the proper state,
         determining whether to forward the call;
         upon determining that the call is to be forwarded, forwarding the call without answering the call; and
         upon determining that the call is not to be forwarded,
            answering the incoming call prior to the computing system entering the proper state; and
            after answering the incoming call,
               sending to the caller via the answered incoming call an indication that the incoming call is on hold; and
               signaling the computing system to cause the computing system to enter the proper state, and
      upon determining that the computing system is in the proper state, suppressing the answering of the incoming call by the auxiliary call control component.

11. The computer-readable storage media of claim 10, wherein the proper state is a state suitable for answering the incoming call.

12. The computer-readable storage media of claim 10, wherein signaling the computing system comprises sending an identifier of the incoming call to the computing system.

13. The computer-readable storage media of claim 10 further comprising, upon receiving the incoming call, providing an indication of the incoming call.

14. The computer-readable storage media of claim 10, wherein the incoming call comprises signaling the communications server to park the incoming call.

15. An auxiliary call control component that alerts a computing system of an incoming call, the auxiliary call control component comprising:
   a computing system interface for coupling to and communicating with the computing system;
   a network interface for coupling to and communicating over a communications link;
   a registration component that registers with a communications server as an endpoint for a user; and
   a call processing component that receives an incoming call for the user, and that processes the incoming call to alert the computing system of the incoming call, processing including:
      determining whether the computing system is in a proper state for picking up the incoming call; and
      after determining that the computing system is not in the proper state,
         picking up the incoming call prior to the computing system entering the proper state; and
         signaling the computing system to cause the computing system to enter the proper state.

16. The auxiliary call control component of claim 15 further comprising a power source for supplying energy to allow the auxiliary call control component to function, the power source being independent of the coupled computing system.

17. The auxiliary call control component of claim 15 further comprising a deflection component that, upon determining that the computing system is not in the proper state and determining to forward the incoming call, forwards the incoming call to a preconfigured number.

18. The auxiliary call control component of claim 15 further comprising a display screen for displaying an indication of the incoming call.

* * * * *

UNITED STATES PATENT AND TRADEMARK OFFICE
CERTIFICATE OF CORRECTION

PATENT NO. : 8,102,841 B2  
APPLICATION NO. : 11/566789  
DATED : January 24, 2012  
INVENTOR(S) : Arulkumar Elumalai et al.

Page 1 of 1

It is certified that error appears in the above-identified patent and that said Letters Patent is hereby corrected as shown below:

In column 11, line 26, in Claim 10, delete "state," and insert -- state; --, therefor.

Signed and Sealed this  
Thirteenth Day of March, 2012

David J. Kappos  
*Director of the United States Patent and Trademark Office*